United States Patent
Drainville et al.

(10) Patent No.: US 6,785,724 B1
(45) Date of Patent: Aug. 31, 2004

(54) ON-DEMAND WEB SERVER

(75) Inventors: Michael Drainville, Manville, RI (US); Martin Flohr, Holliston, MA (US)

(73) Assignee: Walchem Corporation, Holliston, MA (US)

(*) Notice: Subject to any disclaimer, the term of this patent is extended or adjusted under 35 U.S.C. 154(b) by 0 days.

(21) Appl. No.: 09/432,326

(22) Filed: Nov. 2, 1999

(51) Int. Cl.$^7$ .................. G06F 15/16; G06F 15/173; H04M 11/00; H04J 11/00
(52) U.S. Cl. .................. 709/227; 709/217; 709/224; 379/106.08; 370/260
(58) Field of Search ................. 709/227, 229, 709/225, 203, 223, 230–233, 217, 224; 707/102, 10; 379/102.2

(56) References Cited

U.S. PATENT DOCUMENTS

| | | | |
|---|---|---|---|
| 5,720,037 A | 2/1998 | Biliris et al. ............ 395/200.09 |
| 5,805,442 A | 9/1998 | Crater et al. ................. 364/138 |
| 5,809,118 A | 9/1998 | Carmello et al. ...... 379/102.02 |
| 5,835,720 A | * 11/1998 | Nelson et al. ............... 709/224 |
| 5,918,019 A | * 6/1999 | Valencia ..................... 709/227 |
| 5,956,482 A | * 9/1999 | Agraharam et al. ........ 709/203 |
| 5,961,594 A | 10/1999 | Bouvier et al. ............. 709/223 |
| 6,038,602 A | * 3/2000 | Ishikawa ..................... 709/227 |
| 6,041,356 A | 3/2000 | Mohammed ................ 709/227 |
| 6,112,246 A | * 8/2000 | Horbal et al. ............... 709/230 |
| 6,112,247 A | 8/2000 | Williams ..................... 709/236 |
| 6,115,713 A | 9/2000 | Pascucci et al. .............. 707/10 |
| 6,124,806 A | 9/2000 | Cunningham et al. . 340/870.02 |
| 6,131,121 A | * 10/2000 | Mattaway et al. .......... 709/227 |
| 6,138,160 A | * 10/2000 | Boies et al. ................. 709/227 |
| 6,144,657 A | * 11/2000 | Baehr ......................... 370/352 |
| 6,243,838 B1 | * 6/2001 | Liu et al. ...................... 714/57 |
| 6,275,490 B1 | * 8/2001 | Mattaway et al. .......... 709/249 |
| 6,377,571 B1 | * 4/2002 | Tai .............................. 370/355 |
| 6,424,648 B1 | * 7/2002 | Ng et al. ..................... 370/352 |

FOREIGN PATENT DOCUMENTS

| | | |
|---|---|---|
| WO | WO 99/25095 | 5/1999 |
| WO | WO 00/00904 | 1/2000 |

* cited by examiner

Primary Examiner—Glenton B. Burgess
Assistant Examiner—Anita Choudhary
(74) Attorney, Agent, or Firm—Fish & Richardson P.C.

(57) ABSTRACT

A system and method that allows one network device that is connected to the Internet to gain access to another network device via the Internet that is initially off-line and connected to an idle phone line, but is ultimately brought on-line, on-demand, in a seamless manner by the first network device for information access.

34 Claims, 11 Drawing Sheets

ON-DEMAND WEB SERVER

BACKGROUND OF THE INVENTION

This invention relates to a method and apparatus for network devices remote from one another to exchange information through the Internet.

Remote communication between network devices, such as access to field-based equipment through a computer located in an office, is essential for reducing maintenance costs associated with data collection and repair works, and to improve system reliability. Eliminating unnecessary service calls and associated travel costs quickly returns the initial investment of purchasing and installing remote access systems.

In order to exchange information directly between two network devices in "real time" via the Internet, it is essential that both devices have an IP address and be connected to the Internet. For example, in order for a web server to always be available to a person surfing the Internet with a web browser, that server must have a static IP address and be continuously connected to the Internet. There is a considerable cost associated with both a continuous Internet connection and a static IP address. When one of the network devices, for example a server, is connected to the Internet via a standard dial-up connection provided by an ISP using the PSTN (public switched telephone network) and a modem, the cost of the continuous open phone line and static IP address can be very high.

The basic concept of exchanging information between one Internet device and another that uses a phone line dial-up account and might not be continuously connected to the Internet is well known; however, these solutions typically involve a form of scheduling and/or an intermediary. For example, the Internet e-mail is a form of scheduled retrieval, while an Internet faxing may be managed by a fax provider's Internet gateway, serving as an intermediary.

This invention is directed to a method and apparatus that allows one network device that is connected to the Internet to gain direct, real-time access to another network device via the Internet that is initially offline and connected to an idle phone line, but is ultimately brought on-line and accessed, on-demand, in a seamless manner by the first network device for the purpose of exchanging information.

SUMMARY OF THE INVENTION

The present invention features an off-line remote device with an embedded web server that connects to the Internet on-demand. Additionally, the invention includes a process that allows a user, using only a standard Internet browser program or other similar program, to gain access to a remote web server that is initially offline, but ultimately brought on-line, on-demand by the client in a seamless manner. In general, in one aspect, the invention provides a system for accessing a remote device. The system includes a server with a static IP (Internet Protocol) address to manage requests from at least one remote device to access from and/or provide information to, an on-demand web server with a dynamic IP address monitoring and providing information about the remote device. The on-demand server is located remotely from the server. The on-demand server is accessible after a wake-up connection from the server in response to a request from a client computer. The client transmits authentication information to the server to initiate requests to access the on-demand web server. In one embodiment the server with the static IP address is a tapping web server and functions in response to a request for accessing information to cause the at least one remote server to connect to the Internet.

Aspects of the invention can include one or more of the following features. The on-demand web server and the tapping web server can host at least one web page as user interface, the wake-up connection from the tapping web server to the on-demand web server can include a telephone ring through a telephone connection. The on-demand web server can gain Internet access via a telephone connection and a dial-up ISP (Internet Service Provider) account and can have an assigned dynamic IP address by an ISP. The on-demand web server can pass the dynamic IP address to the client computer through at least one web page hosted by the tapping web server. The client computer can run a web browser to access the at least one web page hosted by the tapping web server to transmit authentication information. The authentication information can have a user ID and a password. The tapping web server can be continuously connected to the Internet through an ISP using a dial-up modem. The remote device can have a boiler controller. The on-demand web server can reside on the boiler controller and can have a PC in electronic communication with the remote device.

In another aspect the invention provides a system for accessing information available at a remote device. The system includes an on-demand web server monitoring and providing information received from the remote device and a tapping web server in connection with the on-demand web server. The tapping web server is permanently connected to the Internet and managing user-initiated requests to access information available at the on-demand web server through the Internet.

Aspects of the invention can include one or more of the following features. The system can have a client system to initiate requests for accessing the on-demand web server. The on-demand web server can be connected to the Internet after receiving a wake-up call from the tapping web server. The wake-up call from the tapping web server can have a telephone call through a telephone connection or a Ping (Packet Internet Grouper). The tapping web server can be connected to a database storing information about connection status of the on-demand web server.

In another aspect the invention provides a system for accessing information available at a remote location. The system having a corporate web server continuously connected to the Internet. The corporate web server hosting at least one web page accessible to a client running a web browser, a tapping web server linked to the corporate web server, the tapping web server hosting at least one web page for receiving requests from the client for accessing information at the remote location, and continuously connected to the Internet and an on-demand web server connectable to the Internet after receiving a wake-up demand from the tapping web server through a modem. The on-demand web server providing information about the remote location through at least one web page accessible to the client through the Internet.

Aspects of the invention can include one or more of the following features. The wake-up demand from the tapping web server to the on-demand web server can have a telephone ring through a standard POTS connection. The on-demand web server can gain Internet access via a standard POTS connection and a dial-up ISP account. The on-demand web server can be assigned a dynamic IP address by an ISP for gaining Internet access. The on-demand web server can pass the dynamic IP address to the client through the tapping web server. The client can transmit authentication information to the tapping web server for accessing information at the remote location. The authentication information can have a user ID and a password. The tapping web server can be continuously connected to the Internet through an ISP using a dial-up modem. The wake-up demand from the tapping web server can have a Ping (Packet Internet Grouper). The tapping web server can be connected to a database storing information connection status of the on-demand web server and can be linked to the corporate web server through a hyperlink in the at least one web page hosted by the corporate web server. The client accesses can have at least one web page hosted by the corporate web server by entering the domain name of the corporate web server in the web browser.

The invention provides a method for accessing information from a remote device at a remote location. The method is issuing a connection request, connecting an on-demand web server to the Internet in response to receiving the connection request, and accessing information regarding the remote device available at the on-demand web server through a web browser run on a client application connected to the Internet Aspects of the invention can include one or more of the following features. They can establish a connection between the web browser run on the client application and a tapping web server, and can send authentication information from the client application to the tapping web server. Another feature can connect the on-demand web server to the Internet and can dial to an ISP, and receive a dynamic IP address from the ISP. Accessing information regarding at least one remote device can further pass the dynamic IP address to the tapping web server, and it can direct the web browser run on the client application from the tapping web server to the on-demand web server according to the IP address. The issuing a connection request can consist of calling the on-demand web server through a POTS line and can send a PING to the on-demand web server to check connection status.

The invention provides a computer program, residing on a computer-readable medium, for fulfilling a client's request to connect to an on-demand web server at a remote location, the computer program has instructions for causing a computer to receive a request from the client for accessing the on-demand web server, communicate with the on-demand web server, obtain an IP address of the on-demand web server, and pass the IP address of the on-demand web server to the client.

Aspects of the invention can include one or more of the following features. The instructions can cause a computer to communicate with the on-demand web server, check a connected database for a connection status of the on-demand web server, and can call the on-demand web server through a telephone connection if the connection status is negative.

The invention features an apparatus for providing remote data access over the Internet. The apparatus has a detector to receive a signal indicating a user-initiated request to connect, the transmission media to transmit and receive information to and from the Internet, the processor to convert information from the remote device into at least one HTML (Hypertext Markup Language) document, and storage to store at least one HTML document. The invention also features a method to respond to a user-initiated request from a remote location to access local information. The method includes connecting to the Internet, receiving a dynamically assigned IP address, forwarding the IP address, and disconnecting when a maximum idle time is exceeded. The invention can include a response to a PING after connecting to the Internet.

Aspect of the invention also include a method including providing a first network device connected to the Internet, to manage access to a second network device with the second network device being initially off-line and connected to a idle phone line and is brought on-line after receiving a tap from the first network device.

Advantages in the implementations of the invention include one or more of the following. Since a remote web server connection can be established using a standard web browser, authorized Internet users can access the on-demand web server without customized software. Furthermore, since the web server is not required to be continuously on-line, exorbitant metered or unlimited monthly phone line usage charges are avoided. Under the scheme of this invention, and assuming the availability of an ISP that supports a local access number, only nominal local metered usage charges apply and only during user-initiated sessions. Another advantage to having a web server not permanently connected to the Internet, as in this invention, is that this web server does not need a permanent (static) Internet address, further reducing the total connection costs. Finally, under one implementation, this invention can "wake up" the on-demand web server without incurring telephone usages charges. Overall, savings are realized through reduced maintenance costs and reduced downtime of the remote devices because of instantaneous monitoring.

DESCRIPTION OF THE PREFERRED EMBODIMENTS

Figure 1:
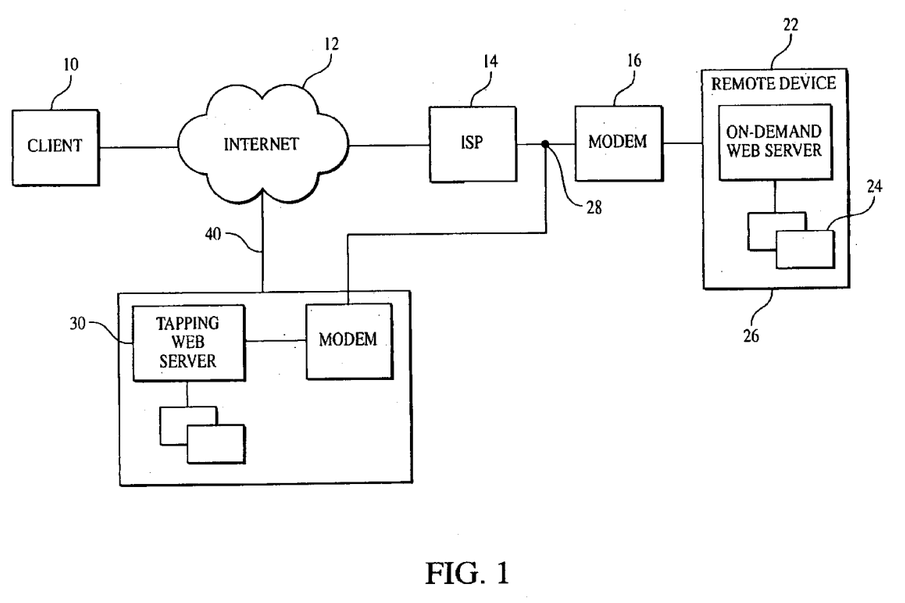
FIG. 1 is a schematic diagram of a system that provides client access to a server that is initially off-line.

Referring to FIG. 1, a remote monitoring system is shown to include a server 30 with a permanent Internet connection 40 running a software application that manages a request for connection from client 10 for an on-demand device 22, such as an on-demand web server or other device that can connect to the Internet with a dynamic IP address. Preferably, the server 30 is a web server running a tapping software application that manages connection requests to remote devices 22 such as the on-demand web server. An example will be described below where the server 30 is a tapping web server 30, the client 10 is a device such as a computer running a web browser and the on demand device 22 is an on demand web server 22.

Client 10 initiates a request, in one implementation, by using a standard Web Browser such as the Internet Explorer by Microsoft or Netscape Navigator. Client 10 can initiate a request via the Internet through other interface programs, such as through an Internet e-mail, file transfer protocol (ftp), or other similar applications. Attached to the tapping web server 30 is modem 26 used to dial the number of the on-demand web server 22 requested by client 10. Modem 26, in one implementation, can be a LAN modem server capable of handling communications to a pool of modems. Modem 26 and tapping web server 30 are wired to the same corporate facility, identified by box 34.

Remove device 20 in one implementation includes information about various parameters to be communicated over the Internet, and is electronically communicated to a separte on-demand server 22. Remote device 20 in another implementation includes the on-demand web server 22. On-demand web server 22 hosts one or more web pages 24 for displaying the various parameters. Remote device 20 in one implementation is the master of a subnet of network devices including slave device 1, slave device 2, and slave device 3 (all not shown). This subnetwork is RS-485 and uses a proprietary communications protocol to communicate between remote device 20 and any of the slave devices 1, 2 and 3 (all not shown). Remote device 20 serves as a gateway to the Internet for the slave devices (all not shown), and the slave devices (all not shown) do not communicate over the Internet directly. Remote device 20 receives the information from slave devices 1, 2, and 3 (all not shown) regarding the various parameters to be communicated over the Internet and converts the information into HTML and Java code. Client 10 accesses the slave devices 1, 2 and 3 (all not shown) through the remote device 20.

Initially, the on-demand web server 22 is wired to an idle phone line 38 through modem 16. On-demand web server 22 is connected to the Internet 12 through a dial-up phone connection 38 to an ISP (Internet Service Provide) 14. On-demand web server 22 is not continuously connected to Internet 12 but is assigned a dynamic IP (Internet Protocol) address by the ISP 14 after it sends a connection request to ISP 14. Tapping web server 30 also hosts one or more web pages 32. Tapping web server 30 is continuously connected to Internet 12 through connection 40. As a consequence, tapping web server 30 has a static IP address. Connection 40 can be a T1 line in one implementation, or ISDN in another implementation.

Figure 2A:
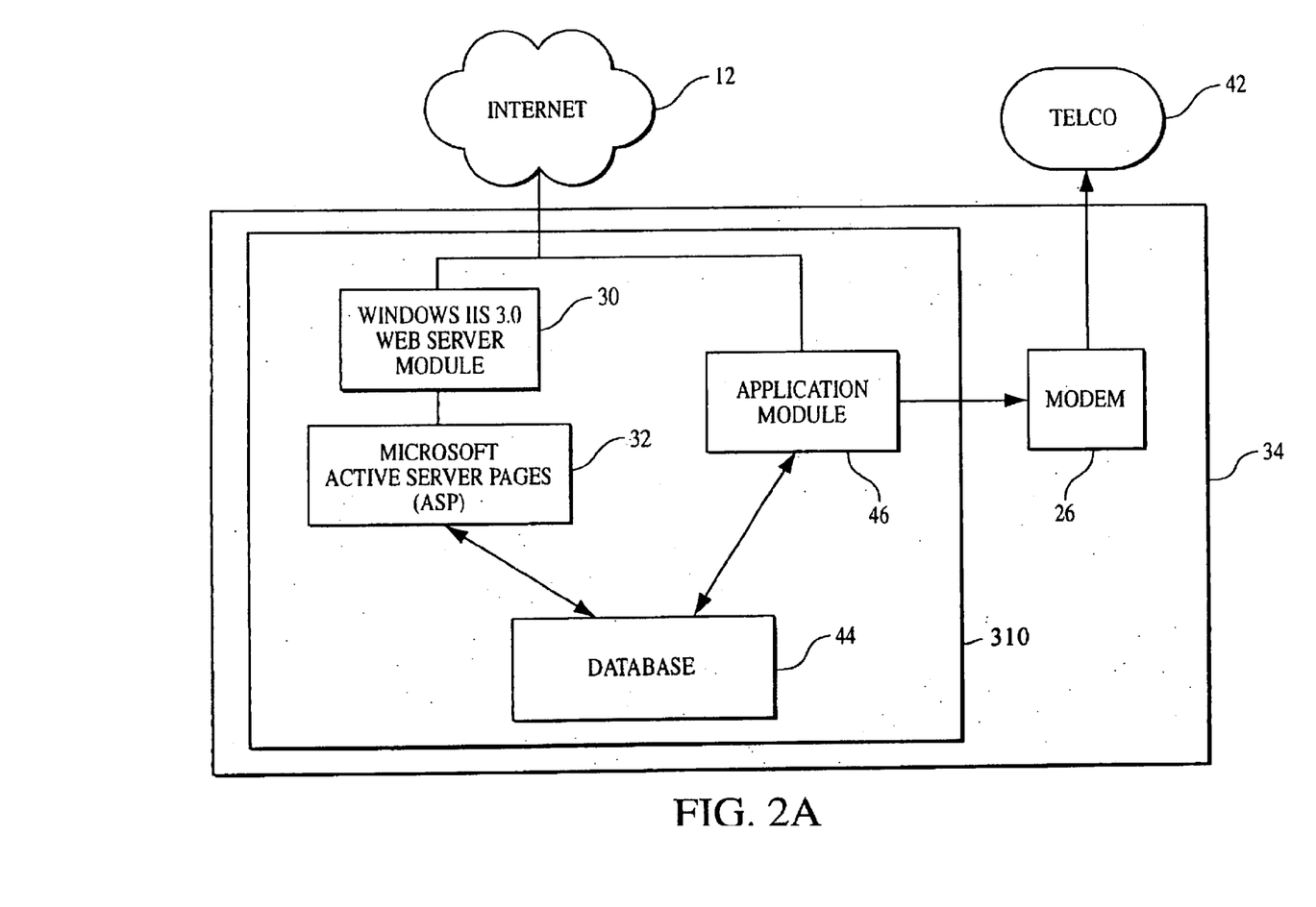
FIG. 2A is a schematic diagram of a tapping web server.

Referring to FIG. 2A, more details of the wired network of corporate facility 34 are shown. Tapping web server 30 includes a web server module 31, Active Server Pages (ASP) 34, database 44, and application module 46. In one implementation, the actual web server 31 is a Windows Internet Information Server (IIS) version 3.0. Application module 46 is developed using Microsoft Visual C++ 5.0 and Microsoft Visual Interdev 1.0. Both the server 31 and the ASP 34 run on the Windows NT 4.0 operating system.

The one or more web pages 32 in one implementation are Microsoft Active Server Pages (ASP). When a client requests connection to the on-demand server 22 via an ASP 32, the ASP places a connection request entry in the database 44. Database 44 in one implementation is a Microsoft Access Database. The application module 46 continuously monitors the database 44 looking for new connection requests. When such a request is detected, and the on-demand web server 22 is not already on-line, the application module initiates the dialing of the on-demand web server 22 through, a phone connection offered by a telephone company 42 via modem 26. This is called a "phone tap." The on-demand web server 22 may only listen to the ring, or it may answer the ring. Application module 46 can also, in other implementations, tap the on-demand server 22 by using a pager tap, or a satellite tap, a wireless cell phone tap, or a number of other equivalents to alert the on-demand web server 22 to get-on line.

After initiating a tap, the application module 46 waits for a "connection complete" or "ping" (Packet Internet Grouper) from the on-demand web server 22. Upon receipt of either response, the dynamic IP address of the on-demand web server 22 is entered as a new record in the database 44. When an ASP page 32 "sees" a new dynamic IP address entry in the database 44, it forwards the dynamic IP address of the on-demand server 22 to the client via redirect tag. Client 10, via a Web Browser, then automatically requests the opening page of the on-demand web server 22. The system is configured to manage the connection of multiple clients to the same on-demand server 22. The ping functions in a similar manner as a wake up request for subsequent connection requests made to a on-demand server 22 that is already connected. It functions to produce a new record in the data base for access by the client that made the subsequent request.

If on-demand web server 22 is already on-line according to records in database 44, instead of dialing, a "ping" is first sent to the on-demand server 22 to ensure that it is still on-line. If a "ping" response is returned, the dynamic IP address in database 44 is forwarded to client 10 in the exact manner it would be if the on-demand server 22 were awakened via the phone tap. If a "ping" response is not returned after a defined timeout period, the application module 46 attempts connection via the phone tap method described above. If a "connection complete" message is not received from the on-demand web server 22 during a pre-determined period, client 10 is notified via an ASP 32 update that Internet connection was not successful.

Figure 8:
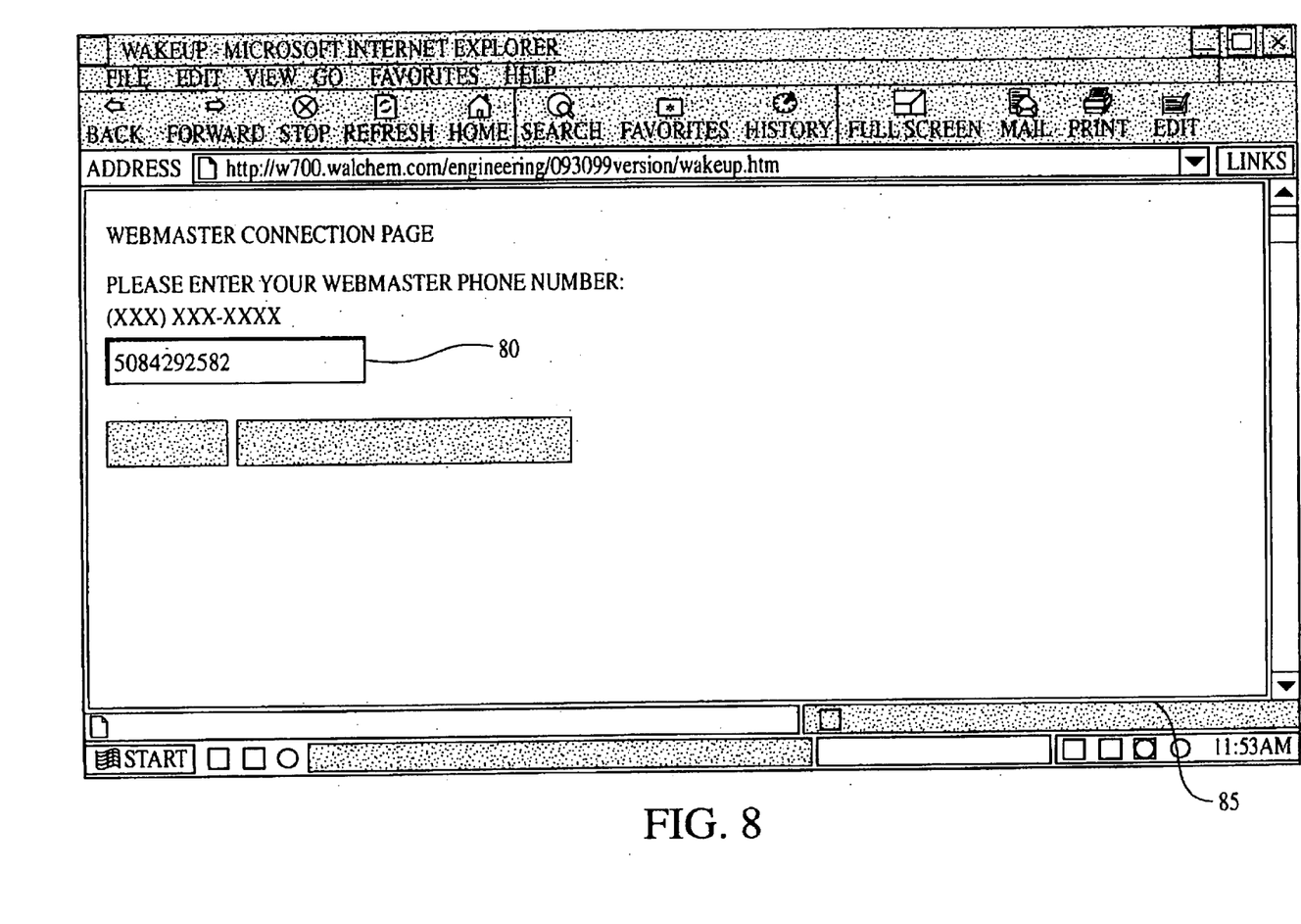
FIG. 8 is a sample web page for receiving the telephone number of the on-demand web server from a client.

A sample phone number ASP 85 is shown in FIG. 8. ASP pages 32 include a basic form, such as ASP 85, that contains a text field 80 for client 10 to input the phone number for on-demand web server 22. When this form is requested and submitted by client 10, ASP page 32 makes a connecting request entry in database 44. A second ASP page containing connection status information "sees" the connection request entry and is sent to client 10. As long as client 10 does not move from this page, the connection status of on-demand web server 22 will be automatically updated to client 10 until the web browser running on client 10 is redirected to the opening page of the on-demand web server 22. The connection status ASP is responsible for keeping client 10 informed about the status. As long as client 10 does not move from this page, the connection status of on-demand web server 22 requested by client 10 will be automatically updated until the final status is returned.

Figure 3:
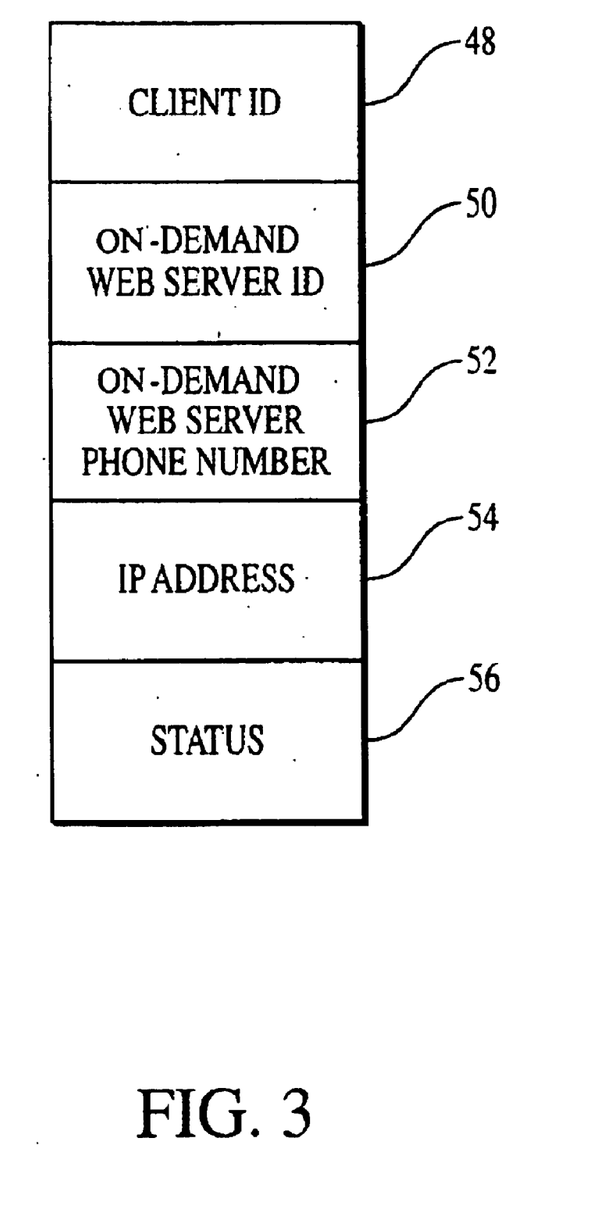
FIG. 3 is a depiction of a record kept in the database connected to the tapping web server.

Database 44 stores communication records between web pages 32 and the application module 46. Database records are produced, updated and scanned by the ASP page 32 and the application module 46. Database 44 stores communication records between ASP pages 32 and the tapping web server 30. A typical record outline is shown in FIG. 3. Field 48 shows the identification of client 10, which is a randomly assigned number. Field 50 shows the ID of the on-demand web server 22, which is also randomly assigned. Field 52 is the telephone number of on-demand web server 22. Field 54 contains the dynamic IP address assigned to on-demand web server 22 by ISP 14 once connection is complete. Field 56 shows the status of the connection status of on-demand web server 22, which can be one of: pining, dialing, dialed, connected, busy, timeout, error, etc.

Figure 2B:
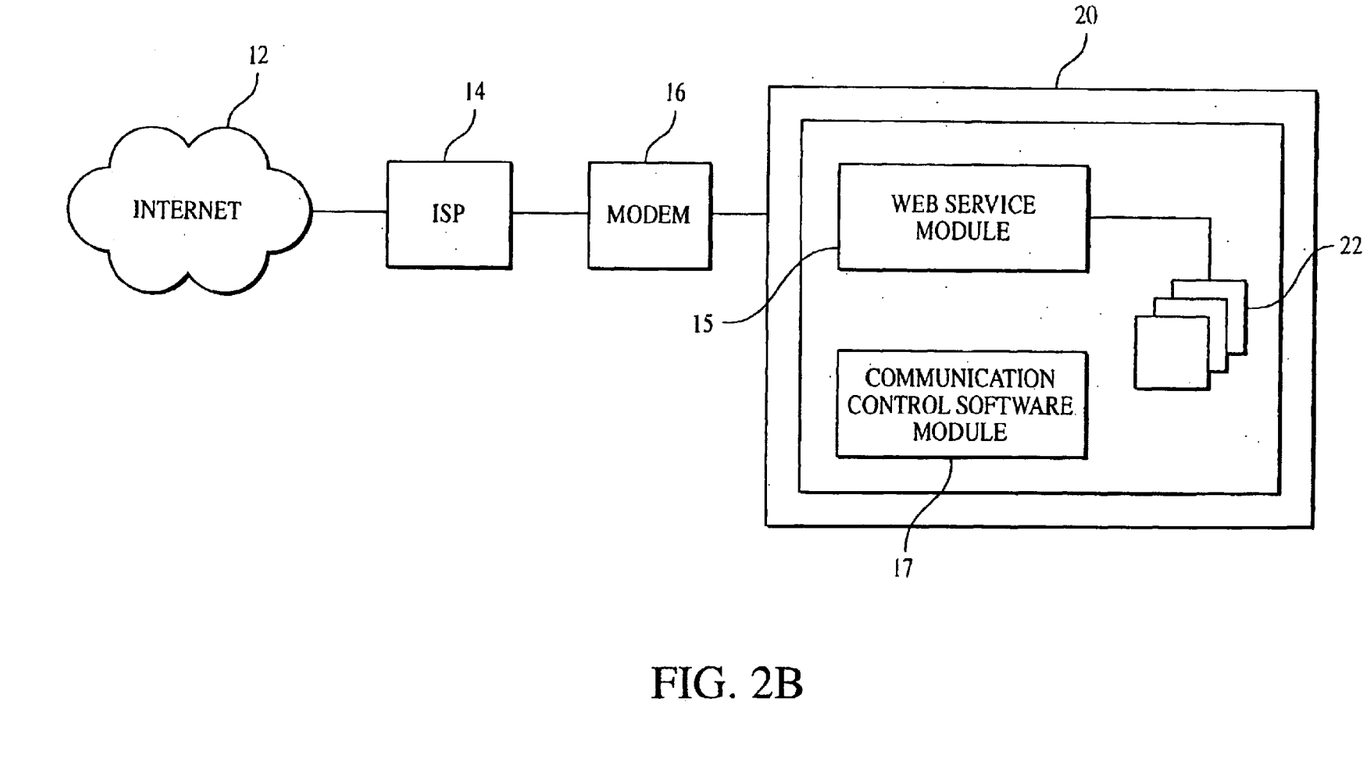
FIG. 2B is a schematic diagram of an on-demand web server.

Referring to FIG. 2B, the details of on-demand web server 22 is shown. The on-demand web server 22 comprises a Phar Lap embedded web serve module 15 available from Phar Lap of Cambridge, Mass., communication control software module 17, and one or more web page 24. The hardware of on-demand web server 22 comprises, in one implementation, a single-board computer and a modem. The communication control software module listens for the modem 16 detecting a ring from the tapping web server 30. After the communication control software module 17 detects a ring it will use modem 16 to dial ISP 14 to establish a connection to the Internet 12. Once remote device 20 is connected to the Internet 12, the communication control software module 17 will send a "connection complete" message to the application module 46 and start the embedded web server module 15. Remote device 20 is then able to respond to http requests for web pages 24.

The communication control software module 17 monitors the Internet connection and disconnects after web server module 15 has not been accessed for a predetermined period of time. At that point the module 17 returns to listening for a ring from the tapping web server 30.

Figure 4:
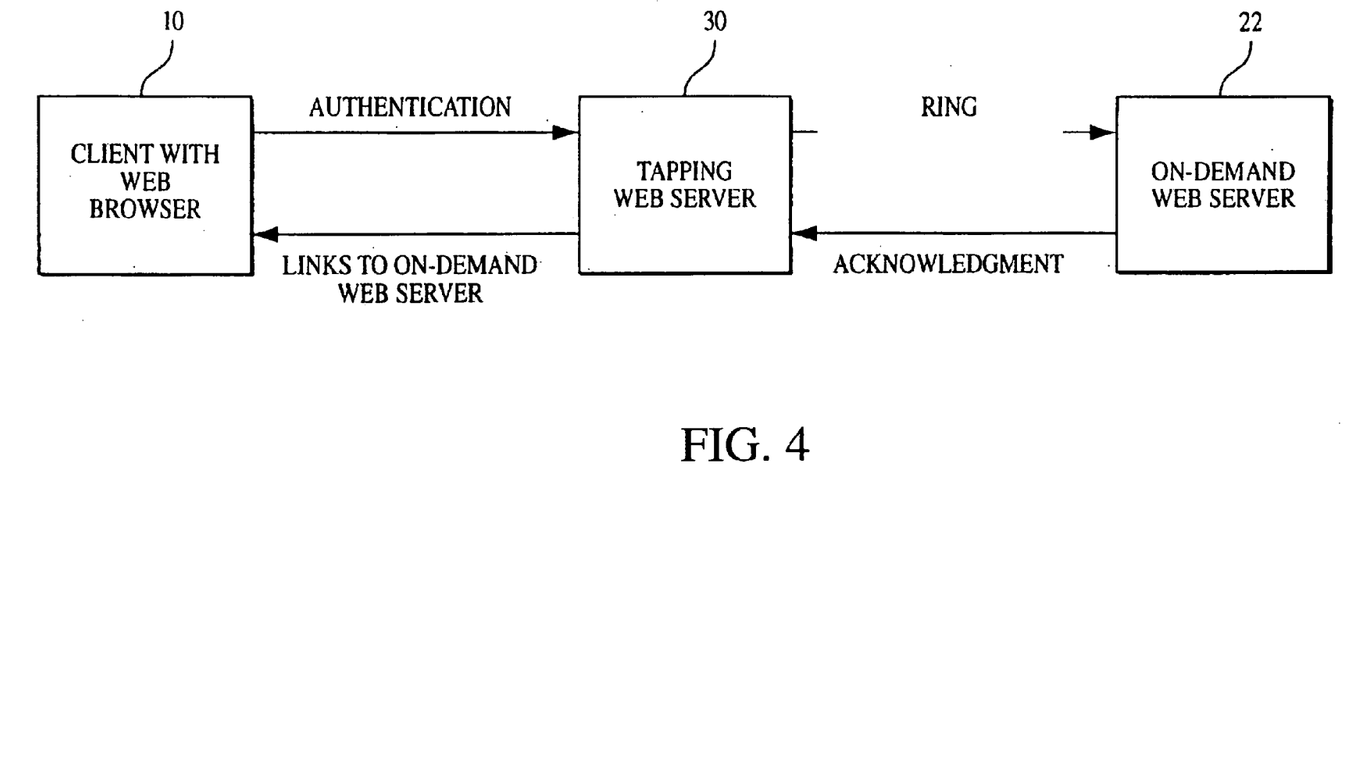
FIG. 4 is a diagram depicting information exchanged between the client and the various servers for forming a connection between the client and the on-demand web server.

Remote device 20 also responds to "ping" requests from the application module 46. While on line, the on-demand web server 22 also listens for "ping" from the tapping web server 30 and returns IP address to the tapping web server 30. FIG. 4 shows the information exchanged between client 10, tapping web server 30, or on-demand web server 22.

Figure 5:
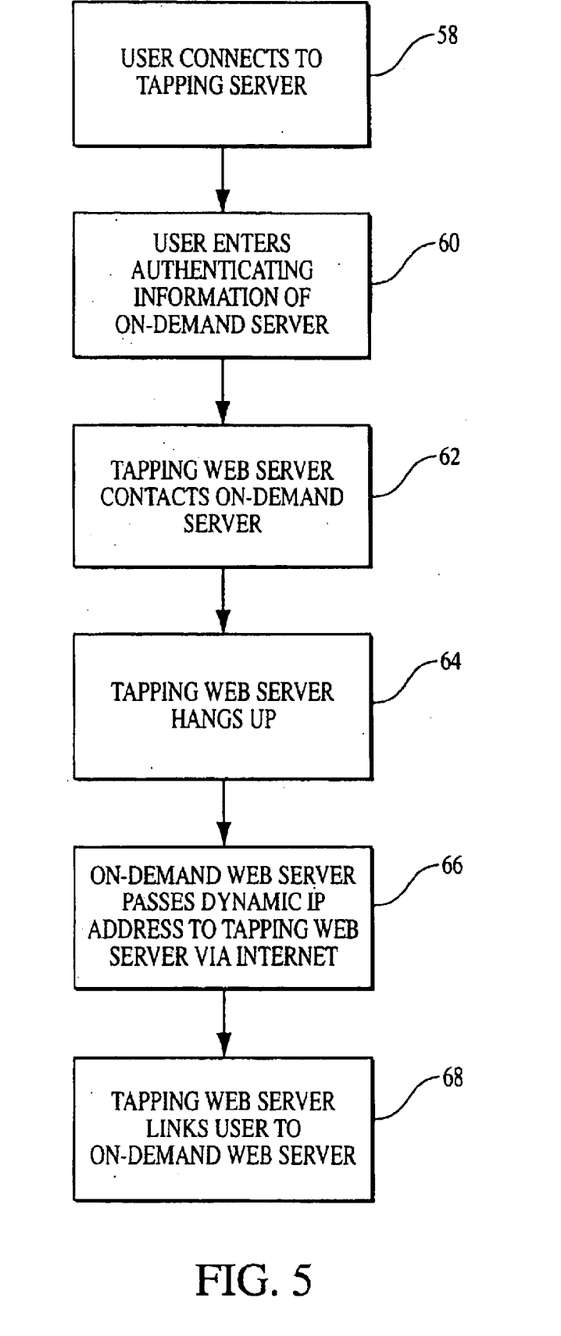
FIG. 5 is a flow diagram of a connection process that brings the on-demand web server on-line.
Figure 6:
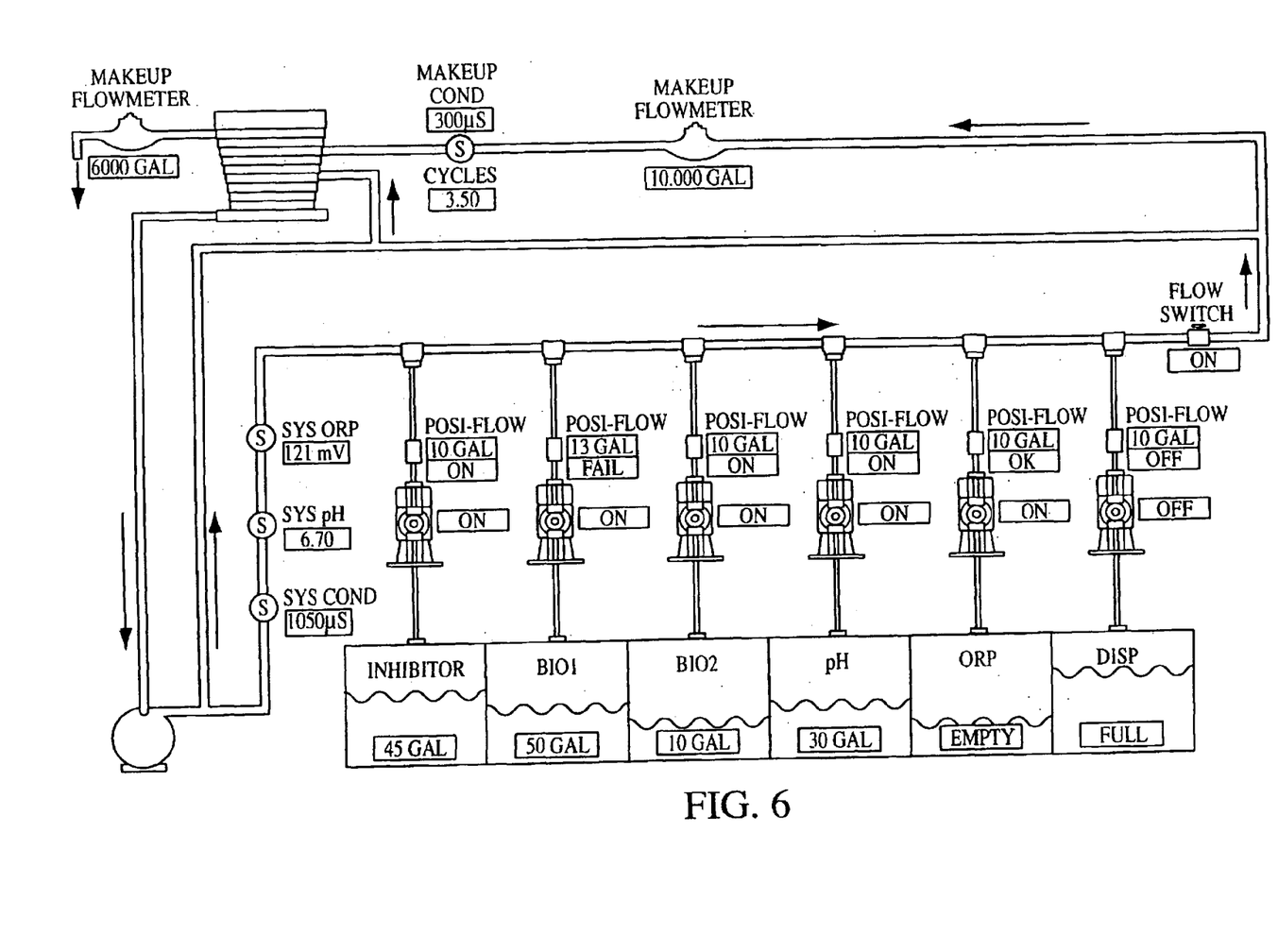
FIG. 6 is a schematic diagram of a remote device.

Referring to FIG. 5, a process for waking up the on-demand web server 22 is shown. The on-demand web server 22 detects a tap from the tapping web server 30 signaling a user-initiated request for the on-demand web server to connect to the Internet and a transmission media to transmit and receive information. The on-demand web server 22 includes a processor to convert information about the remote device 20 into at least one HTML (Hypertext Markup Language) document, and storage to store the HTML document. The on-demand web server 22 connects to the Internet through a dial-up modem 16 through the phone line 38. The remote device 20 can be a device 70 shown in FIG. 6, providing its vital information such as the flow, pH level, etc. Remote device 20 can be an Internet-enabled cooling or boiler water treatment controller. Remote device 20 is used for monitoring and controlling many aspects of water quality in both comfort and process cooling and heating systems. Remote device 20 is also used for waste water treatment monitoring and control.

Figure 7:
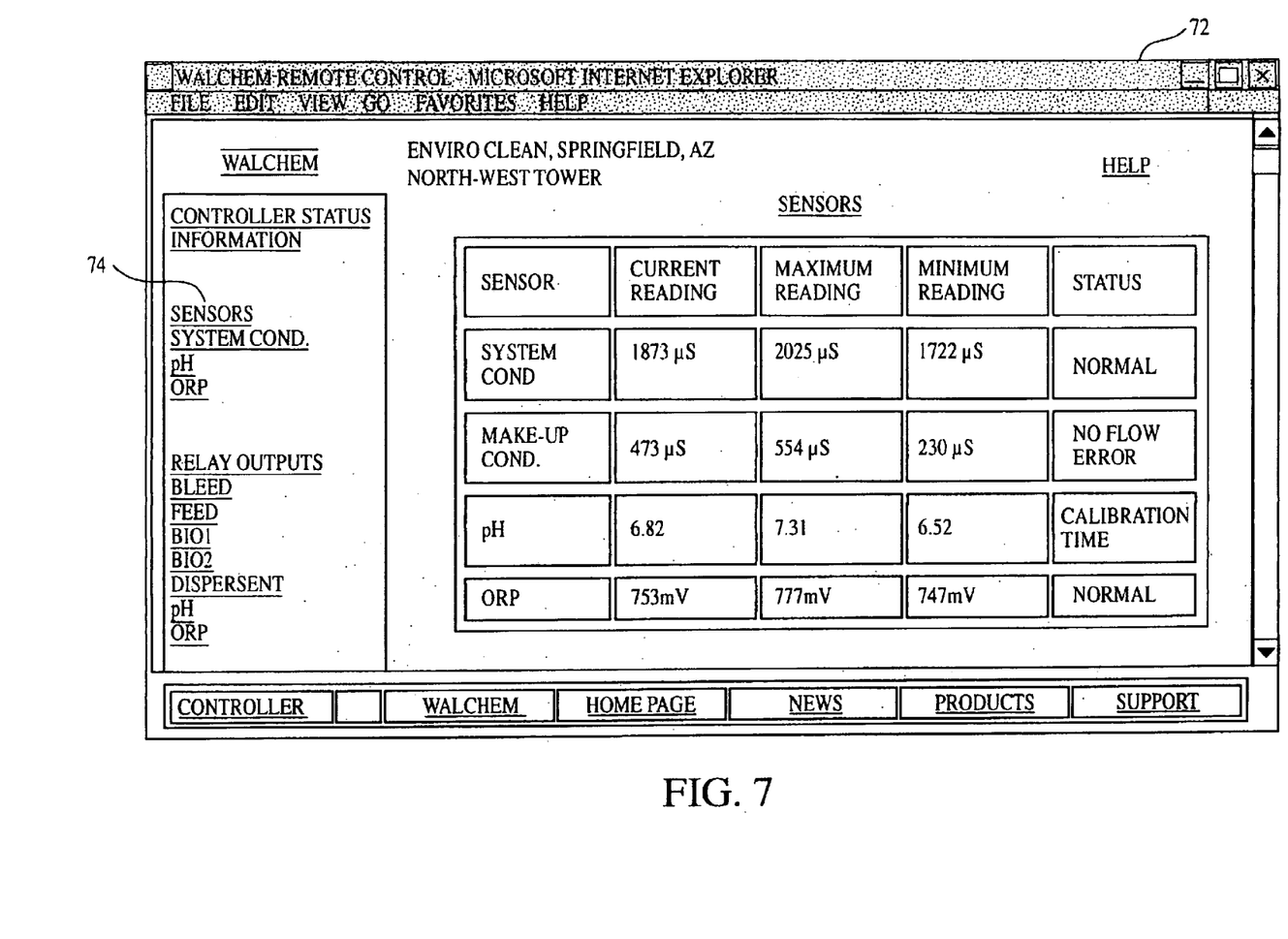
FIG. 7 is a sample web page directing the remote client to the tapping web server.
Figure 9:
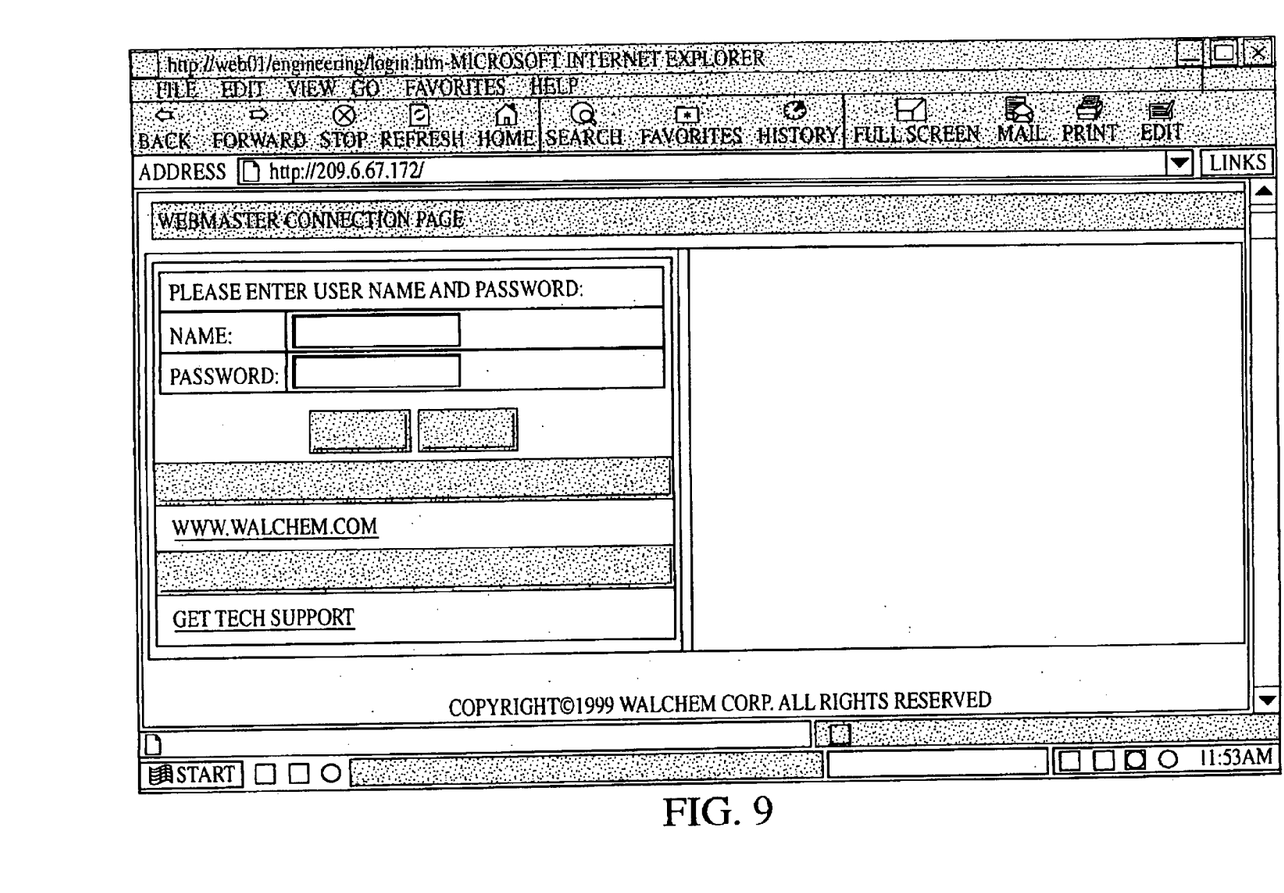
FIG. 9 is a sample web page for receiving the authentication information from a client.

Referring to FIG. 7, a sample web page that could be a general corporate web server, in which a client is allowed to log on to the on-demand web server 22 by clicking on the active area surrounding the word "WebMaster," is shown. Authentication information from client 10 in one implementation includes a password and a user name. A web page 32 for receiving authentication information is shown in FIG. 9.

Referring back to FIG. 5, tapping web server 30 contacts 62 the on-demand web server 22. On-demand web server 22 connects 66 itself to the Internet 12 and passes connection information back to the tapping web server 30 through Internet 12. Tapping web server 30 links 68 client 10 to on-demand web server 22 by means of a redirect tag embedded in the web pages 32 hosted by the tapping web server 30. This connection is seamless, and the web browser running on client 10 will be directed to the web pages 24 hosted by the on-demand web server 22.

Figure 10:
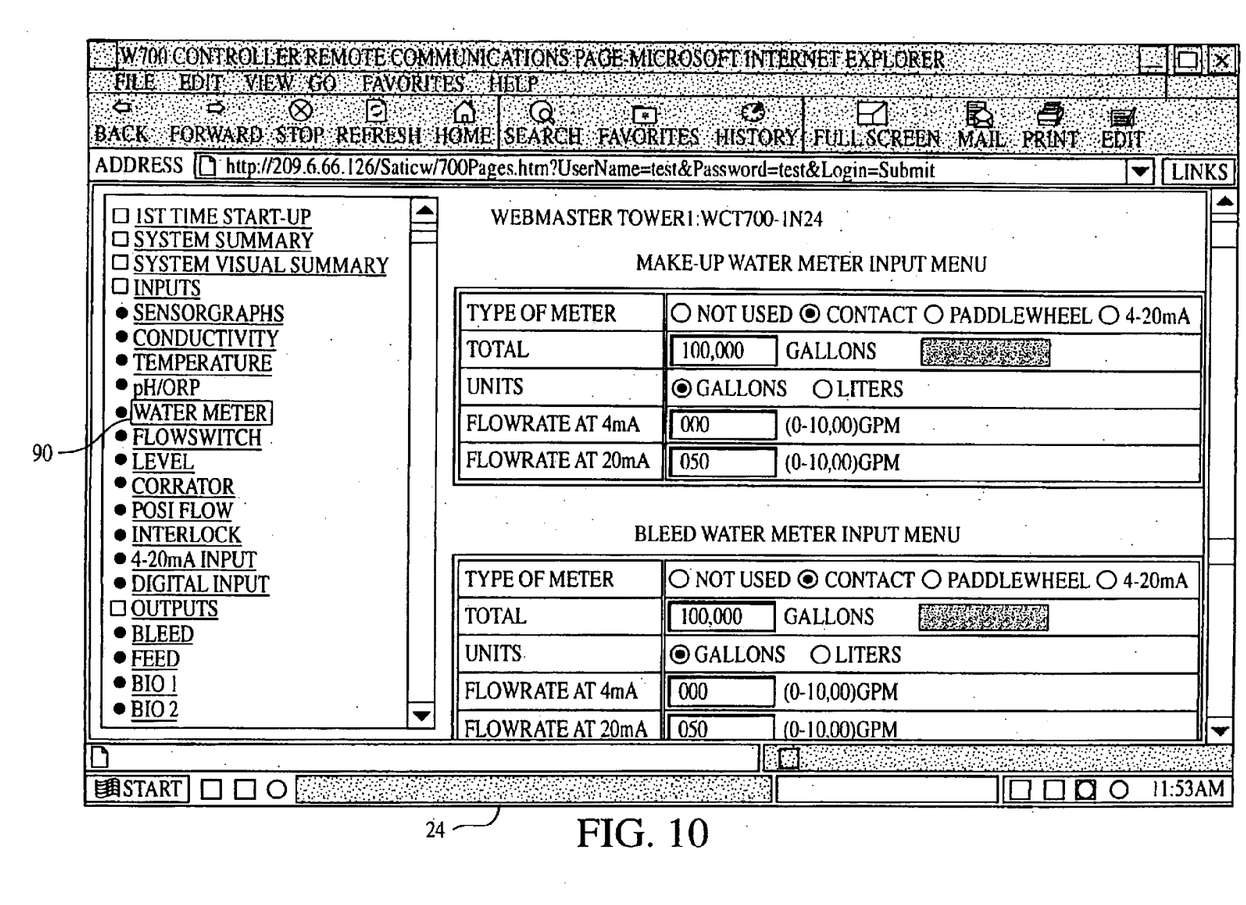
FIG. 10 is an sample web page showing information of a monitored water meter.

FIG. 10 is a sample web page 24. By clicking on item 90 "water meter," the information of water meter at the remote device labeled "Tower WCT700-IN24" will be displayed.

Other Embodiments

The present invention has been described in terms of specific embodiments, which are illustrative of the invention and not to be construed as limiting. Other embodiments are within the scope of the following claims. server

What is claimed is:

1. A system for accessing a remote device, comprising:
a server with a static IP (Internet Protocol) address accessible on the public Internet, to manage requests to access information of the remote device the server including:
an application to manage client browser requests to connect to the remote device by sending a wake-up request to an on-demand device by making a phone call to a phone number provided by a client the number corresponding to a line connected to the on-demand device and receiving an assigned dynamic IP address of the on-demand device after upon receipt of a connection complete from the on-demand device and forwarding the dynamically assigned IP address to a web browser via an embedded HTML redirect tag;
an on-demand device that dials into a local ISP to connect to the Internet after receiving the wake-up request from the server with the static IP address and which receives the dynamic IP address from the local ISP, the on-demand device monitoring and providing information about the remote device, said on-demand device located remotely from the server with the static IP; and
a client device for transmitting authentication information to the server with the static IP address, and the client device executing the web browser application to transmit to the server the telephone number through which the server establishes communication with the on-demand device to initiate requests to access the on-demand device and receive the embedded HTML redirect tag from the application on the server to redirect the client device to the dynamic address of the on-demand device.

2. The system of claim 1 wherein the server with the static IP address is a tapping web server, the on demand device is an on-demand web server.

3. The system of claim 2, wherein the on-demand web server and the tapping web server each hosts at least one web page as user interface.

4. The system of claim 2, wherein the wake-up connection from the tapping web server to the on-demand web server comprises a telephone ring through a telephone connection.

5. The system of claim 3, wherein the on-demand web server gains Internet access via a telephone connection and a dial-up ISP (Internet Service Provider) account.

6. The system of claim 5, wherein the on-demand web server is assigned the dynamic IP address by an ISP.

7. The system of claim 3, wherein the client computer runs the web browser to access the at least one web page hosted by the tapping web server to transmit authentication information and the phone number of the on-demand device.

8. The system of claim 7, wherein the authentication information comprises a user ID and a password.

9. The system of claim 2, wherein the remote device comprises a controller that monitors and/or controls an industrial process system.

10. The system of claim 9, wherein the on-demand web server resides on the controller.

11. The system of claim 2, wherein the on-demand web server comprises a PC in electronic communication with the remote device.

12. The system of claim 2, wherein the on-demand web server is connected electronically and monitors one or more network devices located remote from the on-demand web server.

13. The system of claim 2, wherein the client device is located remotely from the tapping server and the on-demand server.

14. A system for accessing information available at a remote location, comprising:
- a corporate web server continuously connected to the Internet, said corporate web server hosting at least one web page accessible to a client running a web browser;
- a tapping web server linked to the corporate web server, said tapping web server hosting at least one web page for receiving requests from the client for accessing information at the remote location, the requests including a telephone number that the tapping web server can use to establish communication with an on-demand web server, said tapping web server being continuously connected to the Internet; and
- the on-demand web server connectable to the Internet through an Internet Service Provider, after receiving a wake-up demand from the tapping web server through a modem, said on-demand web server providing information about the remote location through at least one web page accessible to the client through the Internet, and
- a remote device providing information pertaining to monitoring and controlling of an industrial process to the client via web pages hosted by the on-demand web server.

15. The system of claim 14, wherein the wake-up demand from the tapping web server to the on-demand web server comprises a telephone ring through a standard POTS connection.

16. The system of claim 11, wherein the on-demand web server listens to but does not answer a call made by the tapping server.

17. The system of claim 16, wherein the on-demand web server is assigned a dynamic IP address by the ISP for gaining Internet access.

18. The system of claim 17, wherein the on-demand web server passes the dynamic IP address to the client through the tapping web server.

19. The system of claim 14, wherein the client further transmits authentication information to the tapping web server for accessing information at the remote location and wherein the authentication information comprises a user ID and a password.

20. The system of claim 19, wherein the remote device is used for waste water treatment monitoring and control.

21. The system of claim 14, wherein the tapping web server is continuously connected to the Internet through an ISP using a dial-up modem.

22. The system of claim 14, wherein the wake-up demand from the tapping web server comprises a Ping (Packet Internet Grouper).

23. The system of claim 14, wherein the tapping web server is connected to a database storing information connection status of the on-demand web server.

24. The system of claim 14, wherein the tapping web server is linked to the corporate web server through a hyperlink in the at least one web page hosted by the corporate web server.

25. The system of claim 14, wherein the client accesses the at least one web page hosted by the corporate web server by entering the domain name of the corporate web server in the web browser.

26. A method for accessing information from a remote device at a remote location, comprising;
- issuing a connection request;
- connecting an on-demand web server to the Internet in response to receiving the connection request by:
- placing a telephone call to a telephone number specified in the connection request the telephone number corresponding to a device in communication with the on-demand web server to wake up the on-demand web server, the on-demand web server not answering the call but responding by using a modem to dial an ISP to connect to the Internet; and
- accessing information regarding the remote device available at the on-demand web server through a web browser run on a client application connected to the Internet.

27. The method of 26, further comprising:
- establishing a connection between the web browser run on the client application and a tapping web server; and
- sending authentication information and the telephone number from the client application to the tapping web server.

28. The method of 27, wherein connecting the on-demand web server to the Internet comprises:
- receiving a dynamic IP address from the ISP.

29. The method of 28, wherein accessing information regarding the at least one remote device further comprises:
- passing the dynamic IP address to the tapping web server; and
- directing the web browser run on the client application from the tapping web server to the on-demand web server according to the IP address.

30. The method of 26, wherein placing a call comprises calling the on-demand web server through a POTS line.

31. The method of 26, wherein issuing a connection request comprises sending a PING to the on-demand web server to check connection status.

32. The system of claim 1 wherein the phone number corresponds to a line connected to a modem that is in communication with the on-demand device.

33. The system of claim 14 wherein the phone number corresponds to a line connected to a modem that is in communication with the on-demand device.

34. The method of claim 26 wherein the device is a modem that is connected to the on-demand device.

* * * * *